Aug. 11, 1931.　　　A. E. HUMPHREY　　　1,818,894
TWINE HOLDER
Filed Oct. 24, 1929　　2 Sheets-Sheet 1
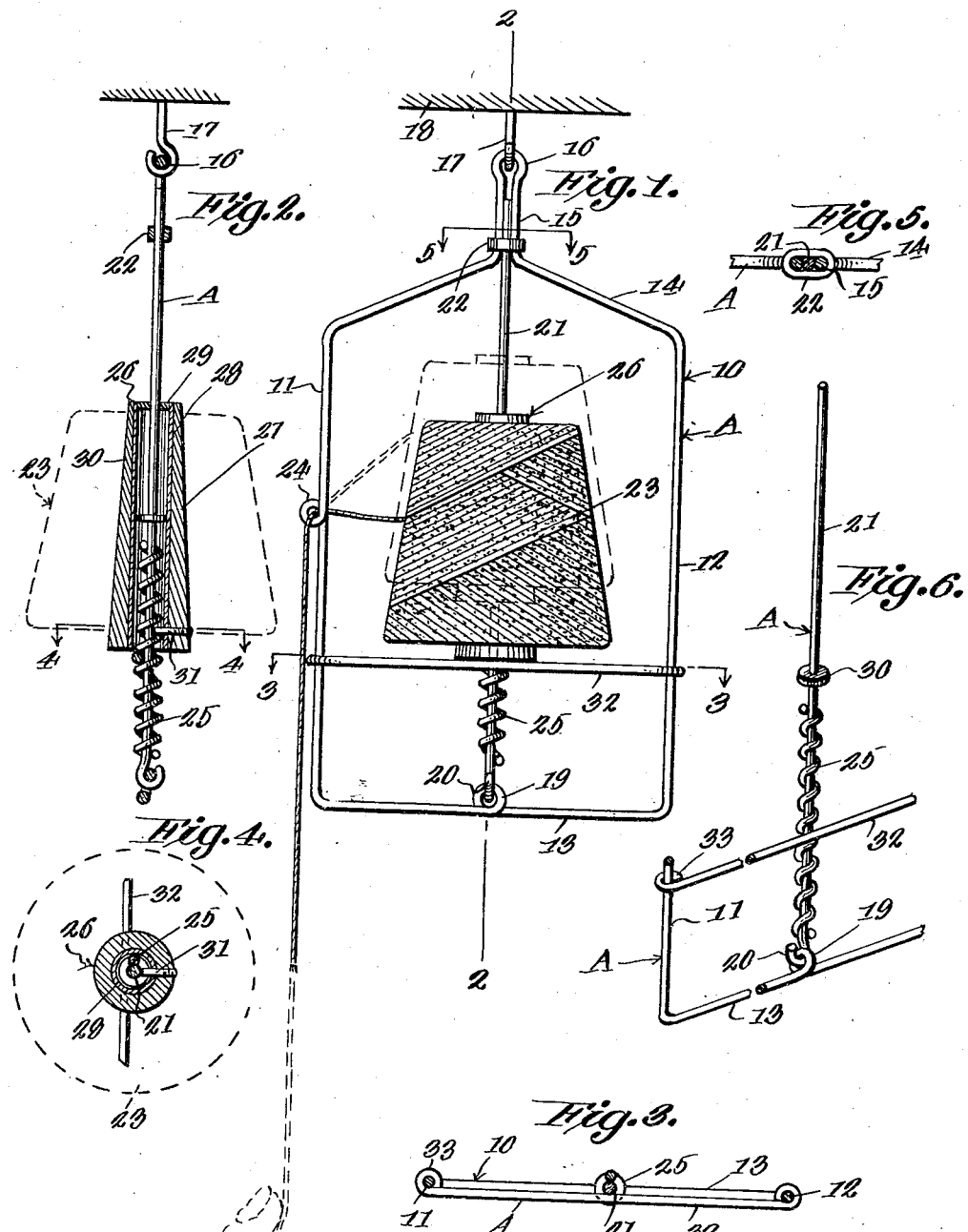
INVENTOR.
ALMON E. HUMPHREY
BY
Irving L. McCathran
ATTORNEYS.

Aug. 11, 1931.    A. E. HUMPHREY    1,818,894
TWINE HOLDER
Filed Oct. 24, 1929    2 Sheets-Sheet 2
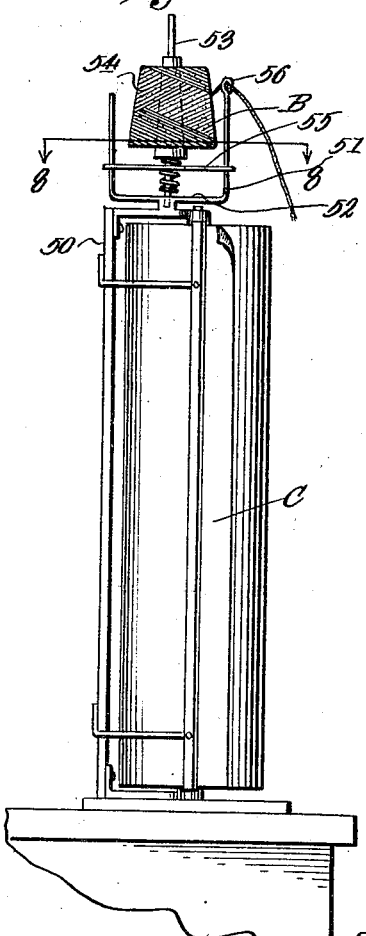
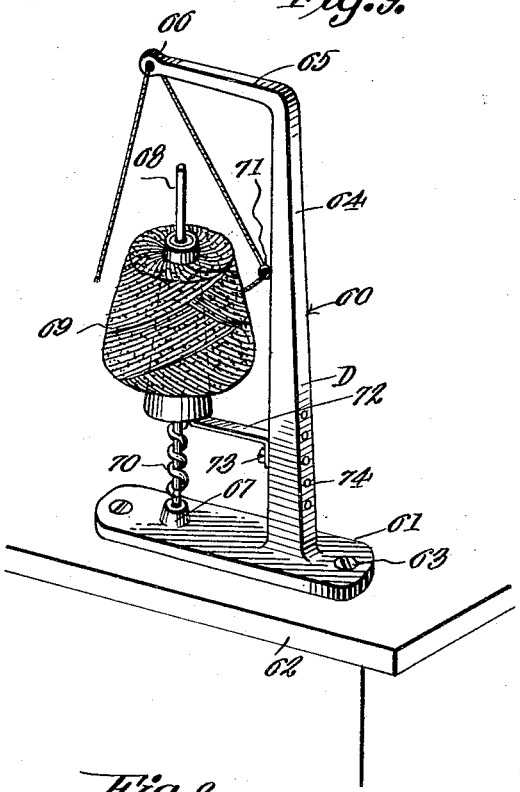
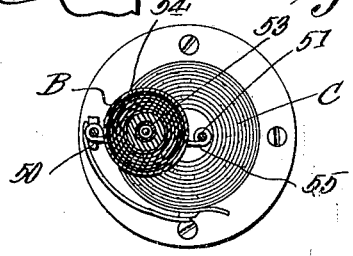
INVENTOR.
ALMON E. HUMPHREY
BY
Irving L. Wathan
ATTORNEYS.

Patented Aug. 11, 1931

1,818,894

UNITED STATES PATENT OFFICE

ALMON E. HUMPHREY, OF OKLAHOMA CITY, OKLAHOMA

TWINE HOLDER

Application filed October 24, 1929. Serial No. 402,239.

This invention relates to holders for cord or twine used in tying up parcels and the like and more particularly to a twine holder for stores and the like.

One of the primary objects of my invention is to provide a twine holder having novel means for automatically picking up the excess length of cord from the ball or twine cone after the tying of a package, so that said length of twine will be raised above the tying counter and out of the way.

Another important object of my invention is the provision of a novel twine holder embodying a central supporting standard for the ball or cone of twine, the standard having a spiral formed thereon adapted to be engaged by a follower pin or the like secured to the form for the ball or twine cone, whereby upon withdrawal of the twine from the ball or cone, the turning of the ball or cone will feed the same up the spiral and upon release of the twine the ball or cone will travel, by its weight, down the spiral and be turned in a reverse direction for permitting the rewinding of the excess length of cord about the ball or cone.

A further object of my invention is the provision of novel means for forming the form or core of the twine ball or cone so that shifting or lateral play of the ball or twine cone on the shaft will be prevented.

A further object of my invention is the provision of a novel adjustable stop arranged in the path of the core of the ball or twine cone so as to limit the travel thereof and thereby regulate the amount of rewind of the twine thereon according to the diameter of the ball or cone of twine.

A further object of my invention is the provision of novel means for forming the frame of the twine holder whereby the ball or twine cone will be effectively held in proper position and permitted of ready withdrawal and replacement of the supporting shaft.

A still further object of my invention is to provide an improved automatic take-up for twine holders of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:—

Figure 1 is front elevation of a twine holder constructed in accordance with my invention, the twine holder being of the suspended type, the twine ball or cone being shown in its normal position in full lines and in its raised position for withdrawing twine therefrom in dotted lines.

Figure 2 is a vertical central section through the same taken on the line 2—2 of Figure 1.

Figure 3 is a horizontal section taken on the line 3—3 of Figure 1 looking in the direction of the arrows, illustrating the novel adjustable stop for the ball or twine cone.

Figure 4 is a detailed horizontal section taken on the line 4—4 of Figure 2 looking in the direction of the arrows.

Figure 5 is a detail horizontal section taken on the line 5—5 of Figure 1 looking in the direction of the arrows, illustrating the lock for the central supporting shaft for the ball or twine cone.

Figure 6 is a detail fragmentary perspective view illustrating the formation of the central supporting shaft for the twine ball or cone and the stop therefor.

Figure 7 is a side elevation illustrating my invention incorporated with a twine holder of the type adapted to be employed with a paper roll holder and cutter.

Figure 8 is a horizontal section through the same taken on the line 8—8 of Figure 7, and Figure 9 is a perspective view of a twine holder constructed in accordance with my invention of the type employed directly on counters.

Referring to the drawings in detail, wherein similar reference characters designate corresponding parts throughout the several views, the letter A generally indicates a twine holder of the suspended type constructed in accordance with my invention as shown in Figures 1 to 6 inclusive. This form of my twine holder A comprises an open frame 10 which can be made of wire of the desired gage. This open frame 10 includes spaced parallel legs 11 and 12, and the connecting lower cross bar 13. The upper ends of the parallel legs 11 and 12 are provided with inwardly directed inclined extensions 14 forming a top bar and these extensions 14 are provided with spaced parallel arms 15 which are arranged in relative close proximity to one another. The upper ends of the arms 15 are connected together by an eye or loop 16 which permits the frame to be suspended from a suitable hanging hook 17. This hook can be secured to any desired type of support such as an overhead beam or ceiling 18.

The lower bar 13 is coiled at a point equidistantly of its ends to provide an eye 19 for the hooked lower end 20 of the vertical supporting shaft or rod 21. By this arrangement the vertical supporting shaft or rod 21 is permitted a swinging movement on the eye 19 and this rod or shaft is of a sufficient length to ride between the parallel arms 15. These arms 15 have slidably mounted thereon the locking loop or ring 22 which when in its lowered position as shown in Figure 1 of the drawings embraces the upper end of the rod or shaft 21 and holds the same in its vertical position against swinging movement.

It is obvious that when the ring 22 is raised beyond the upper end of the shaft or rod that the shaft can be moved to a lowered position for permitting the placing of the ball or cone of twine 23 thereon. This acts as an effective support for the ball or cone of twine.

One of the intermediate side legs of the frame, namely the leg 11, is coiled intermediate its end to provide a guide eye 24, through which the free end of the twine is threaded so that the same can be easily grasped by the hand of the operator.

In accordance with my invention I place about the lower end of the shaft or rod 21 a spiral wire member 25 but it is obvious that the shaft can be otherwise made to provide the spiral or screw. The provision of the spiral 25 on the shaft forms one of the salient features of my invention, as will be later described. The ball or cone of twine 23 is mounted upon a novel core 26 which extends axially through the same, and this core may comprise an outer frusto-conical shaped wood body 27, with a metal tube 28 inserted therein. The upper end of the metal tube 28 is closed by a suitable plug or cap 29 having an axial opening which acts as a guide for the bore. Likewise the shaft or rod 21 has secured thereto a washer or collar 30 which also acts as a guide for the core incident to the sliding of the same on the rod, or shaft 21 and the plug 29 and the collar 30 acts as means for preventing lateral shifting movement of the core and the cone of twine on said shaft or rod.

Extending radially through the core 26 is a pin 31 which engages the convolutions of the spiral 25 and thus during the turning movement of the twine and its core the same will be raised and lowered on the shaft and by the spiral incident to the engagement of the pin with the convolutions of the spiral.

In operation of my improved twine holder when it is desired to wrap a package or parcel the free end of the twine is grasped and pulled downward. The uncoiling of the twine off of the cone will rotate the cone and its core about the shaft or central rod 21 and consequently the cone and its core will travel up the spiral to a raised position, as indicated in dotted lines in Figure 1 of the drawings. After the twine has been severed and the end released, the twine and its core under the action of gravity, will again ride down the spiral and rotate in a reverse direction which will consequently rewind the excess length of twine about the body of the ball or cone and raise the end of the cone above the counter and out of the way.

Owing to the decrease in diameter of the twine cone, it is necessary to provide means for adjusting the travel of the cone and its core on the shaft 21. Consequently I provide an adjustable stop bar 32 which extends transversely across the frame 10. This stop bar 32 can be of a resilient nature and its end is coiled to provide eyes 33 for receiving the legs 11 and 12 of the frame.

The intermediate portion of the bar can be placed in engagement with the desired convolution of the spiral and is held in an adjusted position thereby and it is obvious that when the core 26 strikes the bore that further downward movement thereof is prevented.

In Figures 7 and 8 I have shown a modified form of my invention which is particularly adapted to be associated with paper roll holders and cutter and I have generally indicated this form of twine holder by the reference character B. The wrapping paper roll holder and paper cutter is of the usual or any preferred construction and forms no part of the present invention and is generally indicated by the reference character C. It is to be noted that this device C is of the vertical type and includes the usual supporting frame 50, the top bar of which supports the novel twine holder B.

The novel twine holder B comprises a U-shaped frame 51 which is secured in any desired way to the top frame bar of the paper holder, as stated. The lower cross bar 52 of the frame 51 supports the central shaft or rod 53 for the cone of twine 54 and this cone travels up and down on the shaft in the same manner as the cone of twine described in the first form, the shaft or rod 53 being provided with the spiral as the core of the twine is provided with the follower. Likewise the legs of the frame 51 are connected together by the adjustable stop 55 which is arranged in the path of the core of the cone of twine.

The upper end of one leg or arm of the frame 51 is coiled to provide a guide eye 56 for the free end of the twine.

The operation of this form of the invention is identical with the first form and will not be described.

In Figure 9 I have illustrated a counter form of my twine holder which is generally indicated by the reference character D and this holder embodies a frame 60 which can be made from cast iron or in fact any desired material. As shown the frame 60 embodies a base plate 61 which can be connected to the counter 62 by the use of suitable fastening elements 63. This base plate has formed or secured thereto the upstanding standard 64 of the upper end of which is provided with a right angularly extending arm 65 overlying the base plate 61. The outer end of the arm 65 terminates in a guide eye 66 for the twine. The base plate 61 at one side of the standard 60 is provided with a socket 67 for the reception of the supporting shaft or rod 68 for the cone of twine 69. This shaft is constructed in the same manner as the first form and is provided with the spiral 70 which is engaged by the follower pin of the core of the ball or cone of twine. The standard 64 is likewise provided with the guide eye 71 for the twine and the twine is first threaded through the eye 71 and then through the eye 66 and then brought downward toward the counter. In order to provide an adjustable stop for the core I provide a bracket arm 72 carried directly by the standard 64 and the bracket arm is provided with a holding bolt 73 which can be inserted into any one of a plurality of openings 74 formed in the standard.

This twine holder functions in the same manner as the twine holder originally described.

From the foregoing description it can be seen that I have provided a novel twine holder in which the excess length of twine left after tying a parcel will be effectively rewound around the ball or cone of twine automatically in order to permit the free end of the twine to be raised above the counter and out of the way of the operator.

Changes in details may be made without departing from the spirit or the scope of this invention, but:—

What I claim as new is:

1. In a twine holder, a frame, a vertical shaft supported by the frame, a spiral on said shaft, a core slidably and rotatably mounted on the shaft for the reception of the twine, said core including a body having an axial bore for receiving the spiral, a closure cap for one end of the bore having an axial opening for snugly receiving the shaft, a guide collar on the shaft arranged in said bore, and a follower pin carried by the body engaging the convolutions of the spiral.

2. In a twine holder, a frame, a vertical shaft supported by the frame, a spiral on the shaft, a core slidably and rotatably mounted on the shaft for the reception of the twine, said core including a body having an axial bore for receiving the spiral, a closure cap for one end of the bore having an axial opening for snugly receiving the shaft, a guide collar on the shaft arranged in said bore, a follower pin carried by the body engaging the convolutions of the spiral, a stop arranged in the path of the core for limiting the movement thereof in one direction, and means for holding the stop in an adjusted position, whereby the core is maintained in a predetermined position on the shaft relative to the spiral.

3. A twine holder comprising a frame including side legs and a connecting bottom bar, a shaft arranged between the legs and connected with the bottom bar, a spiral on said shaft, a core for the twine slidably and rotatably mounted on the shaft, a follower pin carried by the bore for engaging the spiral, and a cross rod slidably mounted on the legs of the frame and having its intermediate portion extending across the shaft for engaging any one of the convolutions of the spiral.

4. A twine holder comprising a frame including spaced parallel legs and a connecting bottom cross bar, inwardly directed extensions formed on the upper ends of the legs, a loop connecting the legs together, a locking ring slidably mounted on the extensions, a shaft hingedly carried by the bottom cross bar and arranged to extend between the extension and to be engaged by said ring for holding the same against accidental movement on the bottom bar, and a core for twine removably received on said shaft.

5. A twine holder comprising a frame including spaced parallel legs and a connecting bottom cross bar, inwardly directed extensions formed on the upper ends of the legs, a loop connecting the legs together, a locking ring slidably mounted on the extensions, a shaft hingedly carried by the bottom cross bar and arranged to extend between the extension and to be engaged by said ring for holding the same against accidental movement on the bottom bar, a core for twine removably received on said shaft, a spiral on said shaft, a pin carried by the core for engaging the spiral, and a stop slidably carried by the legs of the frame for engaging a convolution of the spiral.

In testimony whereof I affix my signature.

ALMON E. HUMPHREY.